(12) United States Patent
Kobayashi et al.

(10) Patent No.: US 11,225,219 B2
(45) Date of Patent: Jan. 18, 2022

(54) AIRBAG DEVICE, METHOD FOR MANUFACTURING AIRBAG DEVICE, AND METHOD FOR DEPLOYING AIRBAG DEVICE

(71) Applicant: Autoliv Development AB, Vargarda (SE)

(72) Inventors: Yuto Kobayashi, Kanagawa (JP); Tsutomu Sakurai, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 78 days.

(21) Appl. No.: 16/787,156

(22) Filed: Feb. 11, 2020

(65) Prior Publication Data

US 2020/0254960 A1 Aug. 13, 2020

(30) Foreign Application Priority Data

Feb. 12, 2019 (JP) .............................. JP2019-022983
Dec. 24, 2019 (JP) .............................. JP2019-233568

(51) Int. Cl.
*B60R 21/237* (2006.01)
*B60R 21/231* (2011.01)
(Continued)

(52) U.S. Cl.
CPC .......... *B60R 21/237* (2013.01); *B60R 21/207* (2013.01); *B60R 21/2176* (2013.01);
(Continued)

(58) Field of Classification Search
CPC .............. B60R 21/237; B60R 21/2176; B60R 21/23138; B60R 21/233; B60R 21/26;
(Continued)

(56) References Cited

U.S. PATENT DOCUMENTS 9,358,943 B2 * 6/2016 Borjeson ................. B60R 21/23
9,688,232 B1 * 6/2017 Loew ..................... B60R 21/231
(Continued)

FOREIGN PATENT DOCUMENTS

CN 112677921 A * 4/2021
DE 102010039882 A1 * 3/2011 ....... B60R 21/23138
(Continued)

*Primary Examiner* — Karen Beck
(74) *Attorney, Agent, or Firm* — Harness, Dickey & Pierce, P.L.C.; Stephen T. Olson

(57) ABSTRACT

[Problem] To provide an airbag device or the like that can suppress the occupant seated in a driver seat from moving toward the passenger seat.
[Solving Means] An airbag device includes an airbag cushion inflating and deploying in a vehicle cabin of a vehicle to laterally restrain an occupant seated in a seat, and the airbag cushion includes: a housing portion that stores an inflator for jetting gas for inflation and deployment; a first portion folded in a roll or bellows shape from one horizontal end of the airbag cushion to a vicinity of the housing portion; a second portion that horizontally extends opposite to the first portion when viewed from the housing portion and is folded back toward the folded first portion; and a third portion that further extends from the second portion disposed opposite to the housing portion (411) with respect to the first portion, the third portion being folded in a roll or bellows shape.

11 Claims, 12 Drawing Sheets

(51) Int. Cl.
    *B60R 21/207*     (2006.01)
    *B60R 21/217*     (2011.01)
    *B60R 21/233*     (2006.01)
    *B60R 21/26*     (2011.01)

(52) U.S. Cl.
    CPC ...... *B60R 21/233* (2013.01); *B60R 21/23138* (2013.01); *B60R 21/26* (2013.01); *B60R 2021/23146* (2013.01)

(58) Field of Classification Search
    CPC ........ B60R 2021/23146; B60R 21/207; B60R 2021/23161
    See application file for complete search history.

(56) References Cited

U.S. PATENT DOCUMENTS

| | | | | |
|---|---|---|---|---|
| 10,259,418 B2 * | 4/2019 | Schuler | ................ | B60R 21/237 |
| 10,926,735 B2 * | 2/2021 | Deng | ............. | B60R 21/23138 |
| 2002/0149186 A1 * | 10/2002 | Halford | ................ | B60R 21/237 |
| | | | | 280/743.1 |
| 2005/0052005 A1 * | 3/2005 | Lunt | ....................... | B60R 21/21 |
| | | | | 280/730.2 |
| 2005/0134032 A1 * | 6/2005 | Downing | ............. | B60R 21/237 |
| | | | | 280/743.1 |
| 2007/0284858 A1 * | 12/2007 | Nishimura | ........... | B60R 21/217 |
| | | | | 280/729 |
| 2014/0077480 A1 * | 3/2014 | Festag | ................... | B60R 21/237 |
| | | | | 280/728.3 |
| 2015/0197209 A1 * | 7/2015 | Fujiwara | ............... | B60R 21/231 |
| | | | | 280/730.1 |
| 2017/0232922 A1 * | 8/2017 | Wiik | ................... | B60R 21/2338 |
| | | | | 280/730.2 |
| 2017/0253213 A1 * | 9/2017 | Fujiwara | ................. | B60R 21/207 |
| 2020/0254960 A1 * | 8/2020 | Kobayashi | ........... | B60R 21/237 |
| 2021/0213904 A1 * | 7/2021 | Parker | ................... | B60R 21/207 |

FOREIGN PATENT DOCUMENTS

| | | | | | |
|---|---|---|---|---|---|
| DE | 102011084093 A1 | * | 4/2012 | ........... | B60R 21/233 |
| EP | 1043196 A2 | * | 10/2000 | ........... | B60R 21/237 |
| EP | 2537717 A1 | * | 12/2012 | ........... | B60R 21/237 |
| EP | 2567870 A1 | * | 3/2013 | ........... | B60R 21/207 |
| EP | 2636563 A1 | * | 9/2013 | ....... | B60R 21/23138 |
| EP | 2979933 A1 | * | 2/2016 | ........... | B60R 21/233 |
| EP | 3808610 A1 | * | 4/2021 | | |
| GB | 2322337 A | * | 8/1998 | ........... | B60R 21/237 |
| JP | 2800486 B2 | | 9/1998 | | |
| JP | H1178761 A | * | 3/1999 | | |
| JP | 2010115947 A | | 5/2010 | | |
| JP | 5126132 B2 | * | 1/2013 | ......... | B60R 21/2338 |
| JP | 2020132138 A | * | 8/2020 | | |
| JP | 2020132138 A | | 8/2020 | | |
| JP | WO2019087698 A1 | * | 10/2020 | ........... | B60R 21/237 |
| KR | 20200134151 A | * | 12/2020 | | |
| WO | WO-2015111425 A1 | * | 7/2015 | ........... | B60R 21/231 |

\* cited by examiner

[FIG. 1]
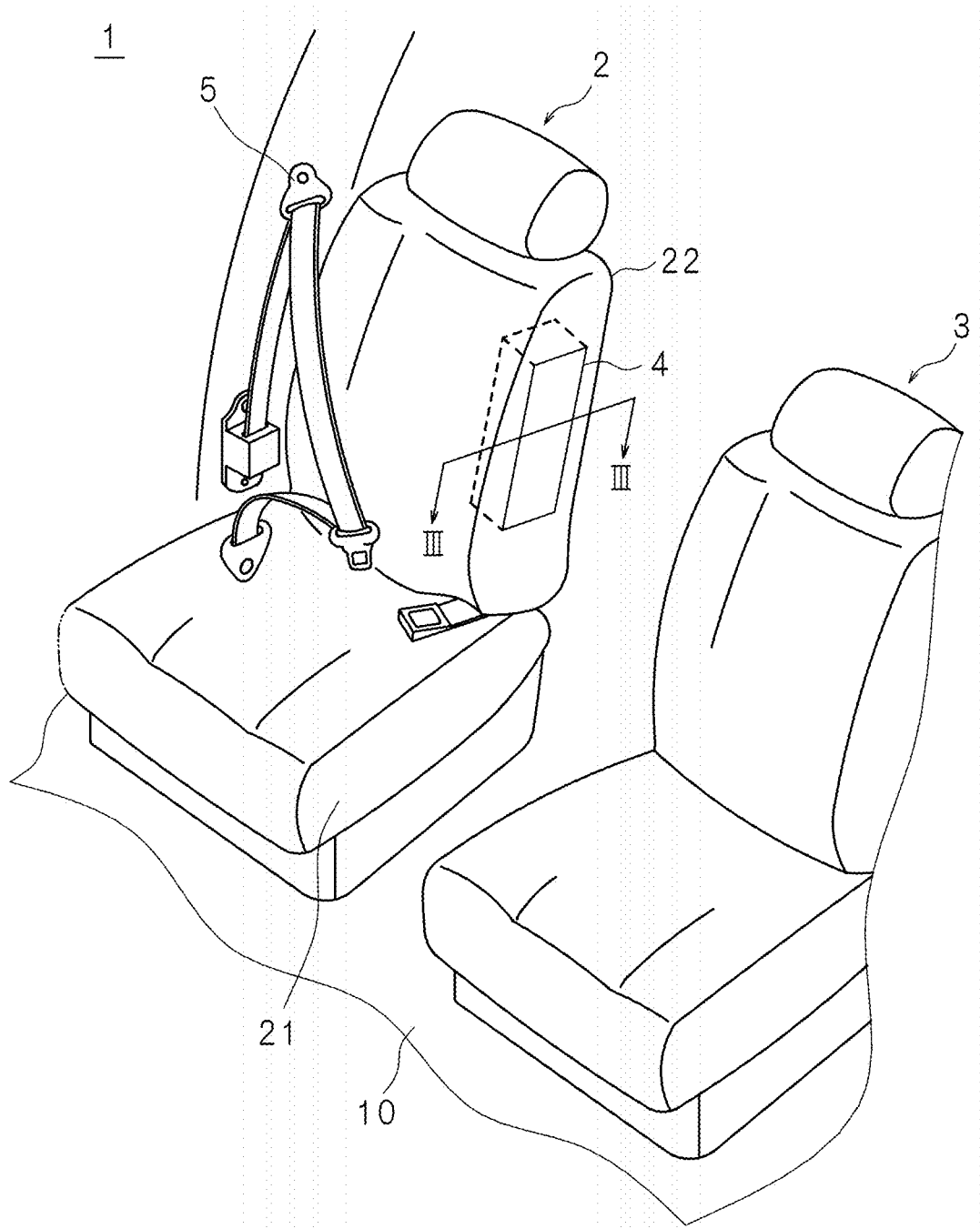

[FIG. 2]
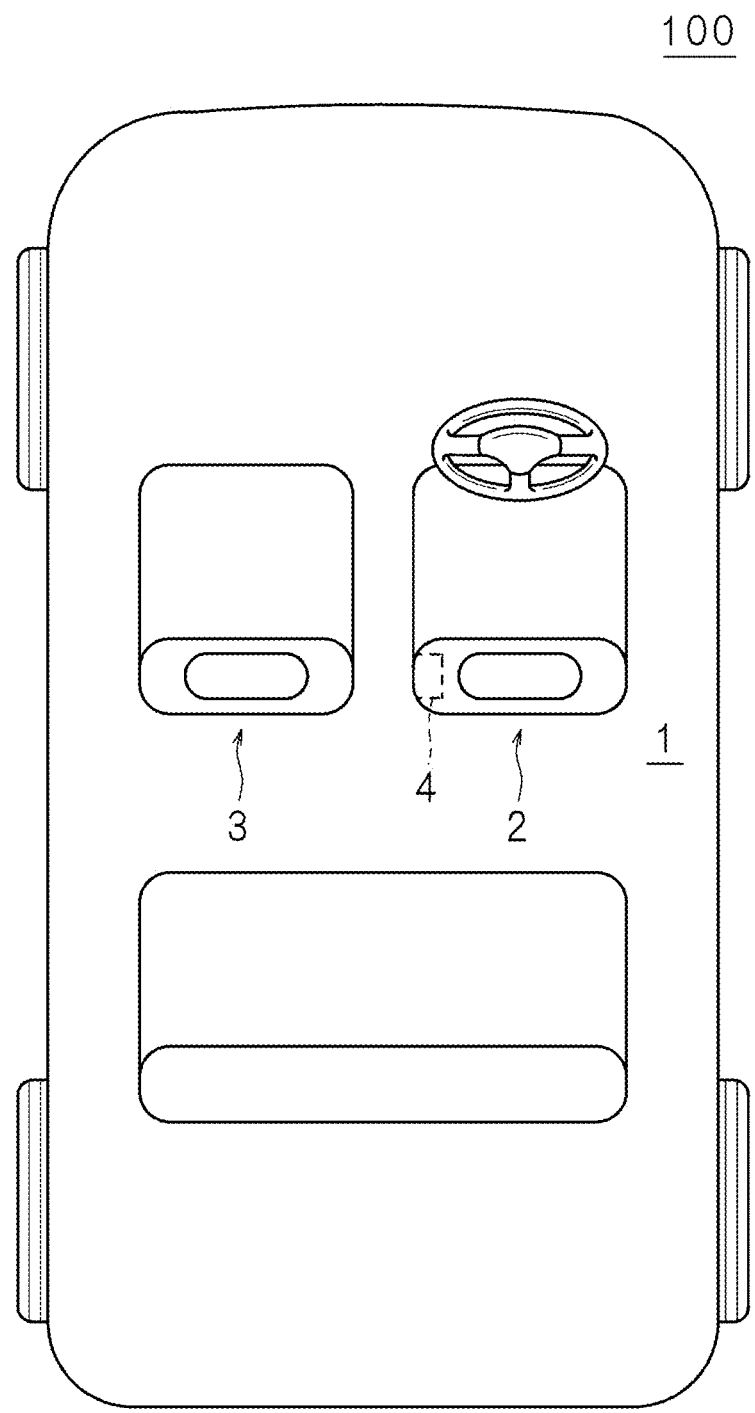

[FIG. 3]
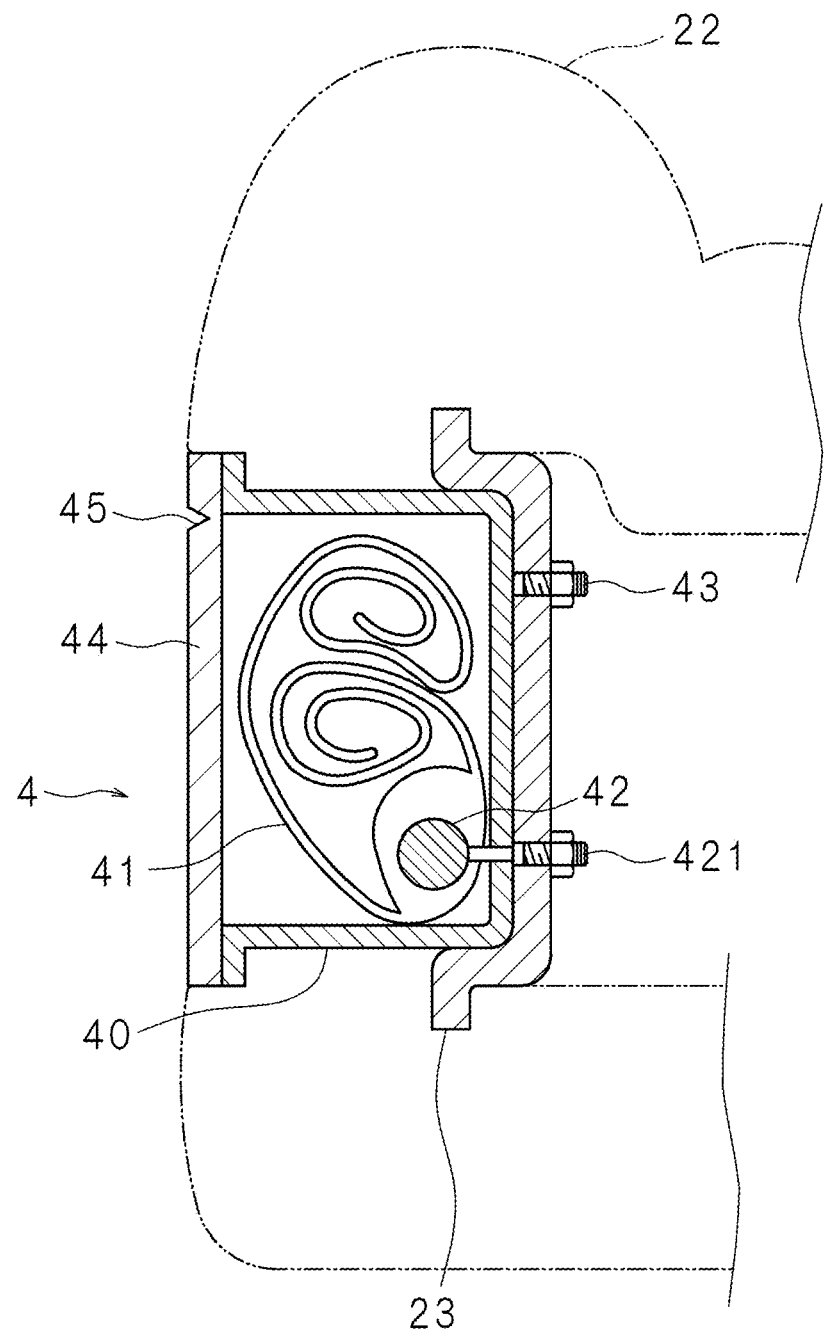

[FIG. 4]
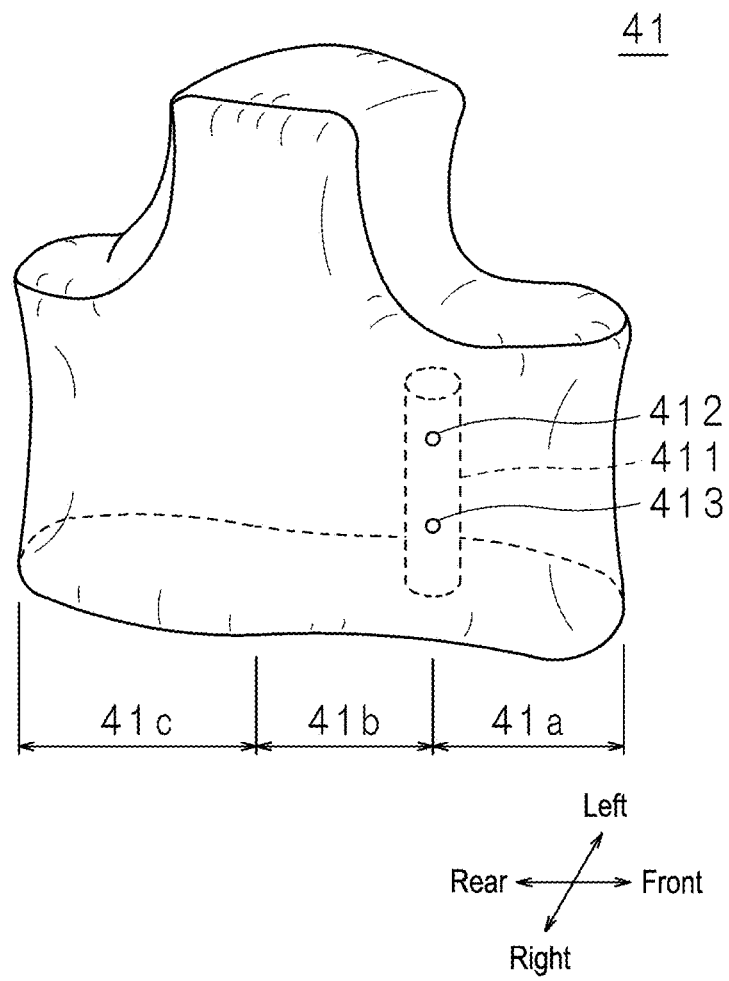

[FIG. 5]
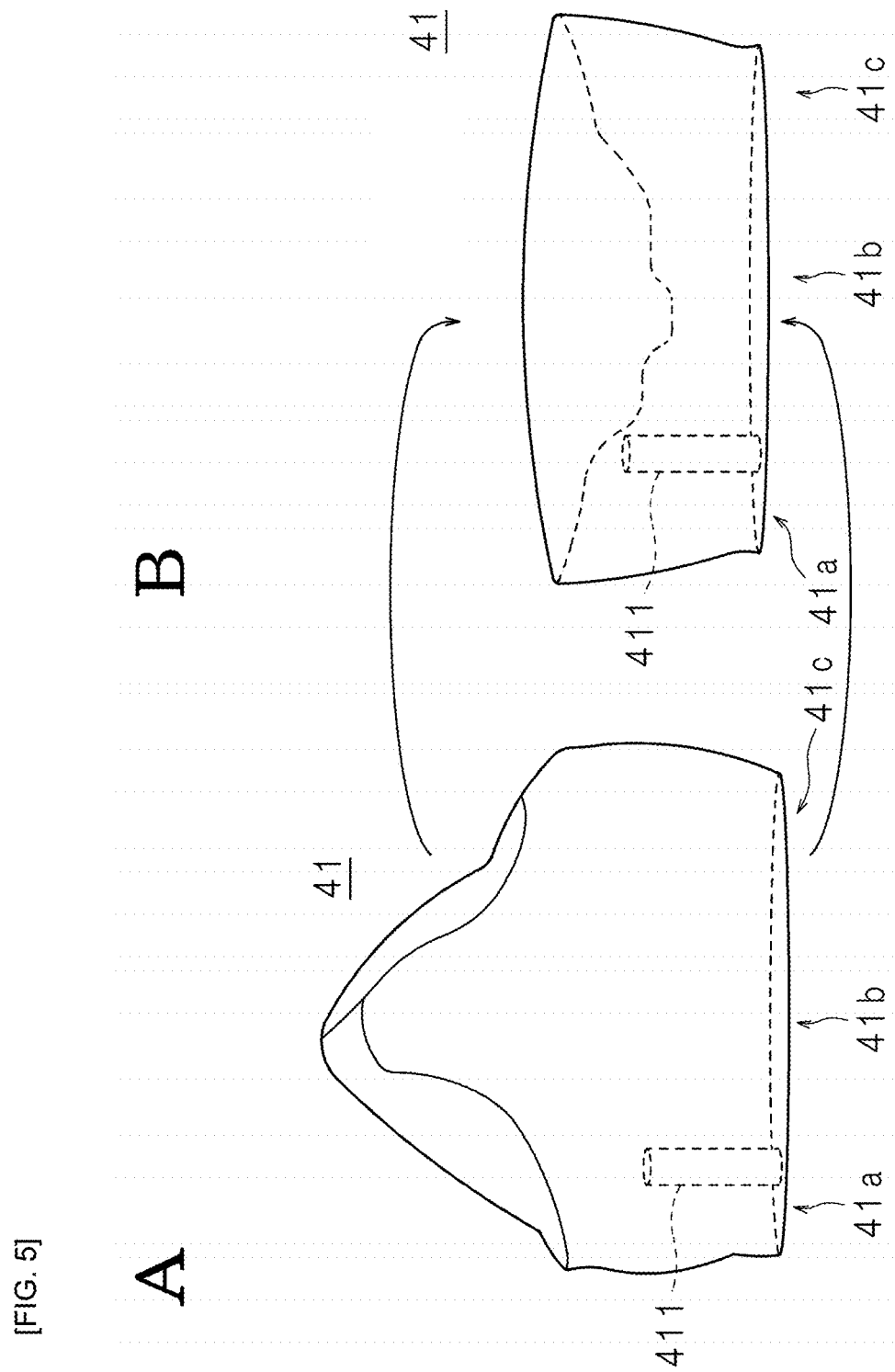

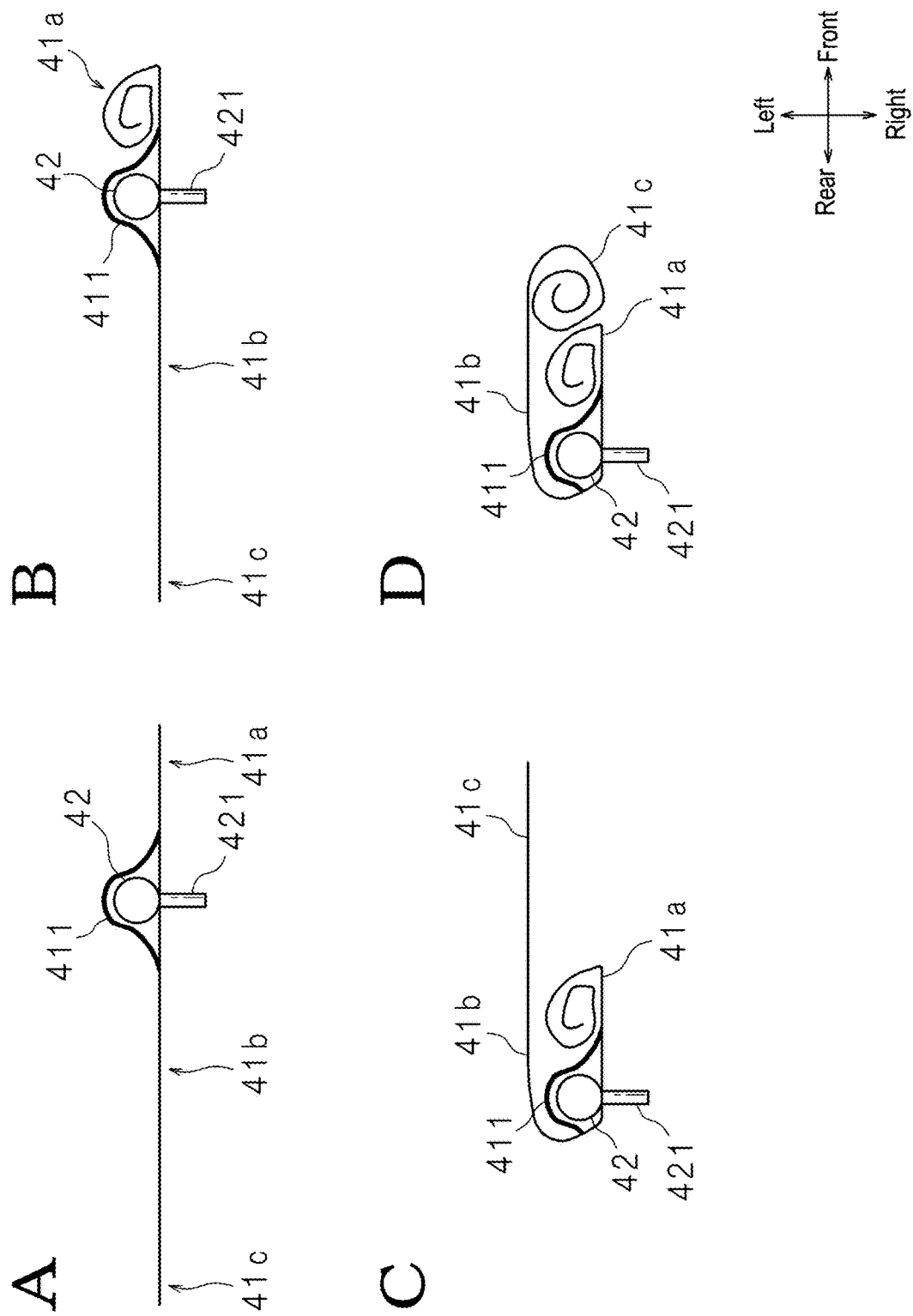

[FIG. 7]
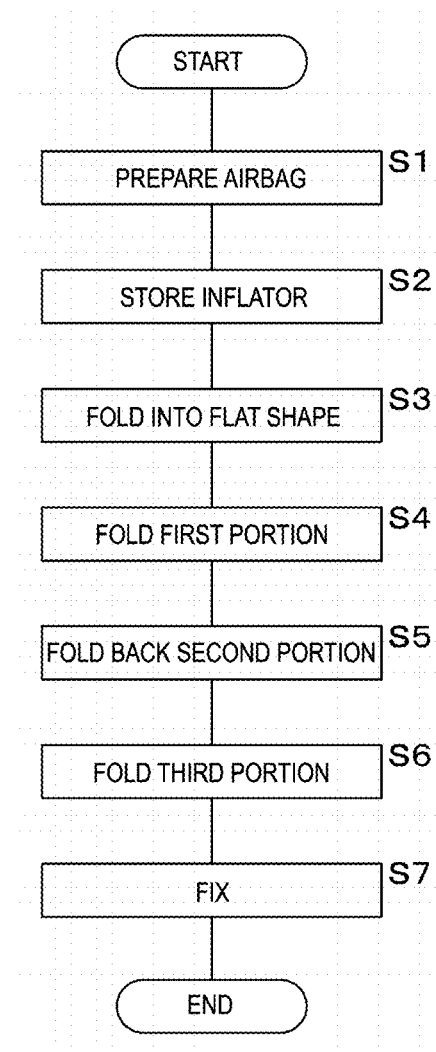

[FIG. 8]
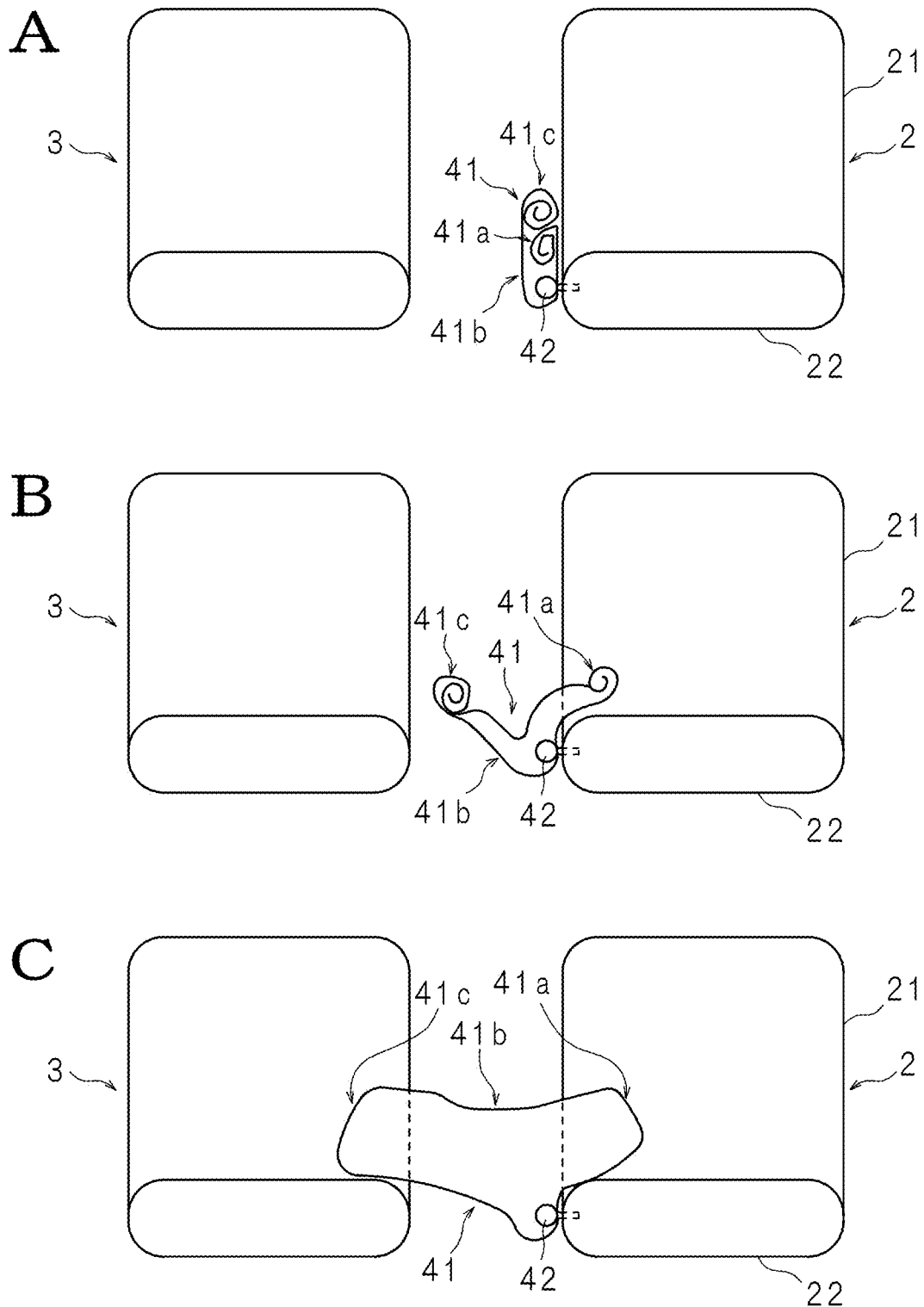

[FIG. 9]
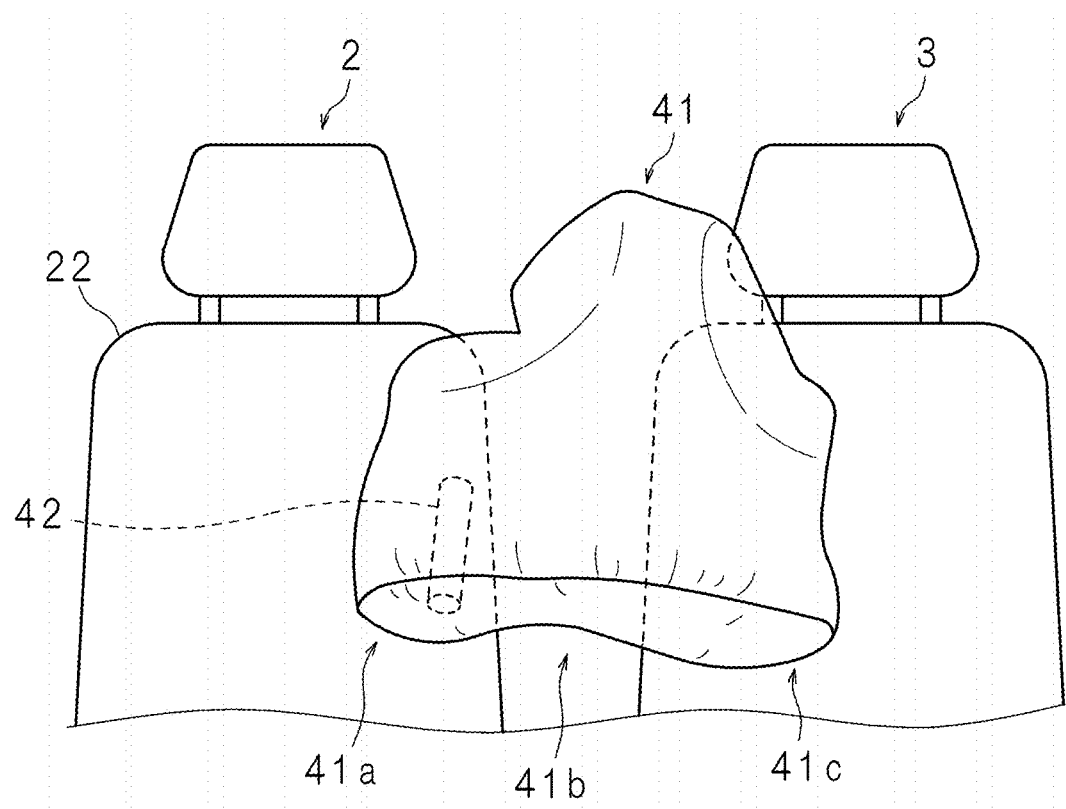

[FIG. 10]
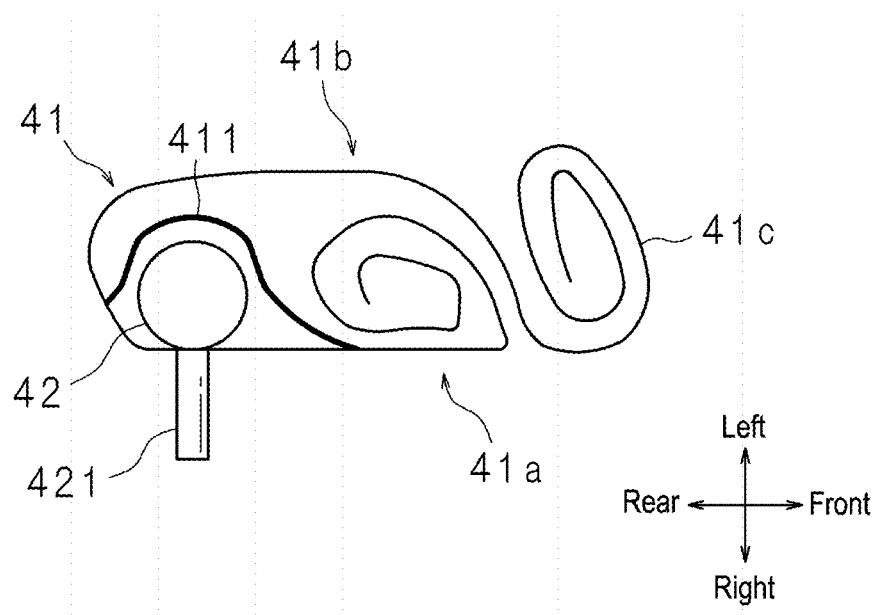

[FIG. 11]
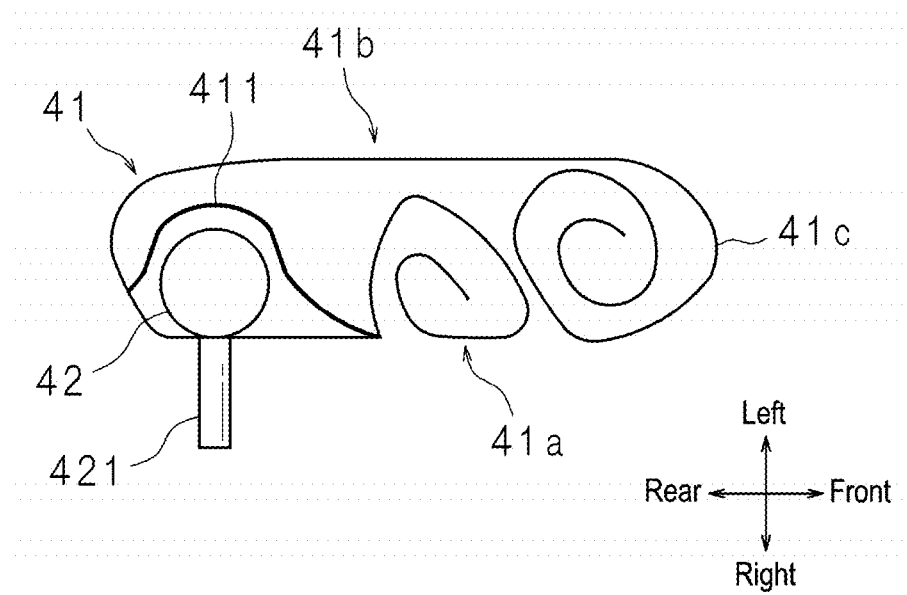

[FIG. 12]
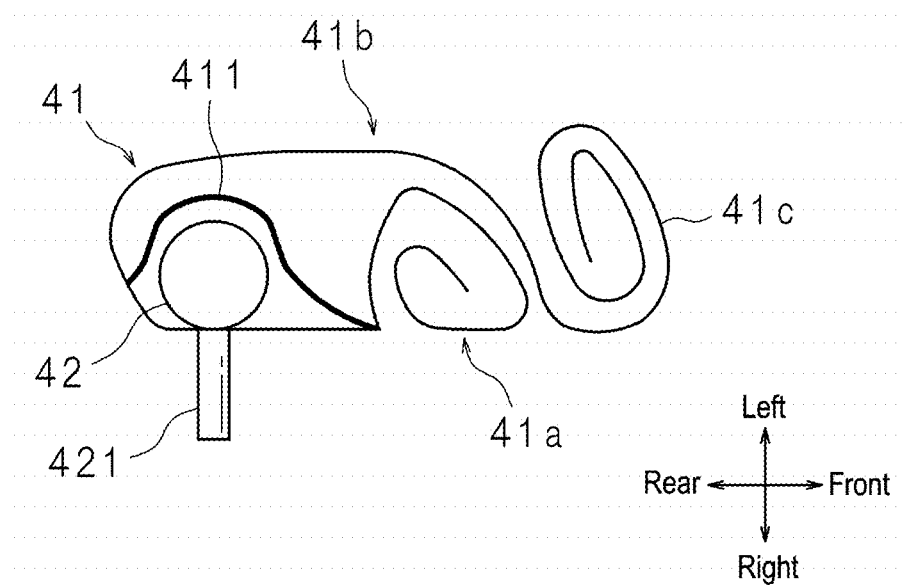

AIRBAG DEVICE, METHOD FOR MANUFACTURING AIRBAG DEVICE, AND METHOD FOR DEPLOYING AIRBAG DEVICE

CROSS-REFERENCE TO RELATED APPLICATIONS

This application claims the benefit of Japanese Patent Application No. 2019-233568 filed Dec. 24, 2019, the disclosure of which is herein incorporated by reference in its entirety.

TECHNICAL FIELD

The present invention relates to a side airbag device.

BACKGROUND

In recent years, vehicles have been equipped with an airbag device. The airbag device is a safety device operated in the event of emergency such as collision to receive and protect an occupant by inflating and deploying an airbag cushion with gas pressure. There are various types of airbag devices depending on the installation site and application. For example, to protect the driver from collision in the front and back direction, a front airbag device is provided in the center of a steering wheel. In addition, to protect each occupant from side collision and subsequent lateral rolling, there are provided a curtain airbag device that inflates and deploys along a side window from the vicinity of a roof of a wall portion, and a side airbag device that inflates and deploys from a side portion of a seat to a portion immediately beside the occupant. Some side airbag devices suppress the occupant seated in a driver seat during side collision or the like from moving toward a passenger seat (Patent Document 1).

RELATED ART DOCUMENTS

Patent Documents

Patent Document 1: JP 2010-115947 A

SUMMARY OF THE INVENTION

Problem to be Solved by the Invention

However, the airbag device described in Patent Document 1 needs to be sized to fill the space from the passenger seat to the side door. Accordingly, there is a need to increase the amount of gas generated in the inflator that supplies gas to the airbag cushion.

In light of the foregoing, an object of the present invention is to provide an airbag device capable of suppressing an occupant from moving from a seat.

Means for Solving the Problem

An airbag device according to the present invention includes an airbag cushion inflating and deploying in a vehicle cabin of a vehicle to laterally restrain an occupant seated in a seat, and the airbag cushion includes: a housing portion that stores an inflator for jetting gas for inflation and deployment; a first portion folded in a roll or bellows shape from one horizontal end of the airbag cushion to a vicinity of the housing portion; a second portion that horizontally extends opposite to the first portion when viewed from the housing portion, the second portion being folded back toward the folded first portion; and a third portion that further extends from the second portion disposed opposite the housing portion with respect to the first portion, the third portion being folded in a roll or bellows shape.

According to the present invention, the occupant can be suppressed from moving from the seat toward the opposite seat.

In the airbag device according to the present invention, the housing portion is included in the second portion.

In the airbag device according to the present invention, the housing portion is included in the first portion.

In the airbag device according to the present invention, the housing portion is provided at a boundary portion between the first portion and the second portion.

In the airbag device according to the invention, the folded second portion covers a central side of the vehicle cabin of the folded first portion, the folded third portion is disposed in front of the first portion, the housing portion is disposed behind the folded portion of the first portion, and at inflation and deployment, at least a portion of the third portion makes contact with the front of an opposite seat to the seat.

According to the present invention, a portion of the airbag cushion deploys toward the front of the opposite seat, thereby allowing the occupant to be suppressed from moving from the seat to the opposite seat.

In the airbag device according to the present invention, the first portion is folded clockwise into a roll shape when viewed from above the vehicle cabin, and the third portion is folded counterclockwise into a roll shape when viewed from above the vehicle cabin.

According to the present invention, immediately after the start of deployment, the first portion applies a force moving toward the opposite seat to the second and third portions, and the third portion deploys while progressing toward the opposite seat. The time for the airbag cushion to reach the opposite seat can be reduced.

In the airbag device according to the present invention, the first portion is folded clockwise into a roll shape when viewed from above the vehicle cabin, and the third portion is folded clockwise into a roll shape when viewed from above the vehicle cabin.

According to the present invention, immediately after initiation of deployment, the first portion applies a force moving toward the front of the vehicle to the second portion and the third portion, and the third portion is directed away from the opposite seat, thereby suppressing the airbag cushion during deployment from making contact with the occupant to provide a strong impact when the occupant is seated in the opposite seat.

In the airbag device according to the present invention, the first portion is folded counterclockwise into a roll shape when viewed from above the vehicle cabin, and the third portion is folded counterclockwise into a roll shape when viewed from above the vehicle cabin.

According to the present invention, the entire airbag cushion is intended moving toward the opposite seat immediately after the start of deployment, thereby enabling time for the airbag cushion to reach the opposite seat to be reduced.

In the airbag device according to the present invention, the first portion is folded counterclockwise into a roll shape when viewed from above the vehicle cabin, and the third portion is folded clockwise into a roll shape when viewed from above the vehicle cabin.

According to the present invention, at deployment, the first portion applies a force moving toward the front of the vehicle to the third portion, and the third portion deploys while moving away from the opposite seat and thus, the third portion deploys to a predetermined degree and then moves toward the opposite seat. Accordingly, even when the seat is further from the opposite seat in the width direction, the airbag cushion can be deployed such that the third portion makes contact with the front of the opposite seat.

A method for manufacturing an airbag device according to the present invention is a method of manufacturing an airbag device with an airbag cushion, the airbag cushion inflating and deploying in a vehicle cabin of a vehicle to laterally restrain an occupant seated in a seat, and the method includes: preparing the airbag cushion having a housing portion that stores an inflator for jetting gas for inflation and deployment; folding a first portion extending from the housing portion into a roll or bellows shape from one horizontal end of the airbag cushion to a vicinity of the housing portion; folding back a second portion horizontally extending opposite to the first portion when viewed from the housing portion toward the folded first portion; and folding a third portion further extending from the second portion disposed opposite the housing portion with respect to the first portion into a roll or bellows shape, and disposing the third portion opposite to the housing portion with respect to the first portion.

A method of deploying an airbag device is a method of deploying an airbag device that inflates and deploys in a vehicle cabin of a vehicle to laterally restrain an occupant seated in a seat, and an airbag cushion of the airbag device includes: a housing portion that stores an inflator for jetting gas for inflation and deployment; a first portion that extends from the housing portion to a front of the vehicle, the first portion being folded in a roll or bellows shape from the front to a vicinity of the housing portion; a second portion that horizontally extends opposite to the first portion when viewed from the housing portion, the second portion being folded back from a back to the front of the vehicle; and a third portion that further extends from the second portion to the front, the third portion being folded from the front in a roll or bellows shape and disposed in the front of the first portion.

According to the present invention, a portion of the airbag cushion deploys toward the front of the opposite seat, thereby allowing the occupant to be suppressed from moving from the seat to the opposite seat.

Effects of the Invention

According to the present invention, the occupant can be suppressed from moving from the seat toward the opposite seat.

BRIEF DESCRIPTION OF THE DRAWINGS

FIG. 1 is a perspective view schematically illustrating the interior of a vehicle including a side airbag device according to a first embodiment.

FIG. 2 is a plan view schematically illustrating an interior portion of a vehicle including the side airbag device according to the first embodiment.

FIG. 3 is a cross-sectional view illustrating the side airbag device taken along a line III-III in FIG. 1.

FIG. 4 is a perspective view illustrating an example of an airbag cushion.

FIG. 5 are explanatory views illustrating a method of folding the airbag cushion.

FIG. 6 are explanatory views illustrating the method for folding the airbag cushion.

FIG. 7 is a flowchart illustrating an example of a manufacturing procedure of the side airbag device.

FIG. 8 are explanatory views illustrating a deployment process of the airbag cushion.

FIG. 9 is a front view illustrating the airbag cushion when deployed.

FIG. 10 is an explanatory view illustrating a method of folding the airbag cushion according to a second embodiment.

FIG. 11 is an explanatory view illustrating a method of folding the airbag cushion according to a third embodiment.

FIG. 12 is an explanatory view illustrating a method of folding the airbag cushion according to a fourth embodiment.

DESCRIPTION OF THE PREFERRED EMBODIMENT

Embodiments of the present invention will be described below with reference to the drawings. Note that "up", "down", and "up and down" directions of the vehicle, which are used in the following description, indicate directions on a line connecting the center of the roof of the vehicle and the center of the floor, the direction toward the roof is referred to as the "up" and the direction toward the floor is "down". Additionally, "front", "back", and "front and back" directions of the vehicle mean that the vehicle forward direction is the "front" direction and the vehicle backward direction is the "back" direction. Furthermore, a vehicle width direction is a direction in which regular seats are arranged side by side, and is a direction orthogonal to the "front and back" direction described above. Also, an opposite seat to a driver seat refers to a passenger seat. The opposite seat to the passenger seat refers to the driver seat. That is, in the description of a seat and an opposite seat to the seat, when the seat is the driver seat, the opposite seat is the passenger seat. On the other hand, when the seat is a passenger seat, the opposite seat is the driver's seat.

First Embodiment

FIG. 1 is a perspective view schematically illustrating an interior of a vehicle including a side airbag device according to the first embodiment. FIG. 2 is a plan view schematically illustrating the interior of the vehicle including the side airbag device according to the first embodiment. FIGS. 1 and 2 illustrate a driver seat 2 and a passenger seat 3, which are installed on a floor surface 10 of a vehicle cabin 1, and a seat belt 5. The driver seat 2 includes a seat portion 21 and a backrest 22 that rises upward from the back of the seat portion 21.

As illustrated in FIG. 2, a side airbag device 4 according to the first embodiment is disposed inside the side surface of the backrest 22 of the driver seat 2 on the passenger seat side, which is installed in the vehicle cabin 1 of a vehicle 100. As illustrated in FIG. 1, the side airbag device 4 has a rectangular parallelepiped shape.

FIG. 3 is a cross-sectional view illustrating the side airbag device 4 taken along a line III-III in FIG. 1. Up and down in this figure correspond to front and back of the vehicle 100. The side airbag device (airbag device) 4 includes an airbag cushion 41 stored in a storage portion 40 and an inflator 42.

The airbag cushion 41 is a fabric bag reinforced, for example, by weaving of high strength fibers such as nylon fibers, and is folded in a roll shape and stored within the storage portion 40. The shape and folding of the airbag cushion 41 will be described later. The inflator 42 is fixed to a framework 23 of the backrest 22 via a bottom plate of the storage portion 40 with a stud bolt 421. The inflator 42 is stored so as to jet gas for inflation and deployment into the airbag cushion 41.

The storage portion 40 is a box with one surface open, and is fixed to the framework 23 of the backrest 22 with a stud bolts 43 and the stud bolt 421 described above. The opening of the storage portion 40 faces the passenger seat 3, and is covered with a cover plate 44 that is flush with the side surface of the driver seat 2. The cover plate 44 is a resin plate having a lower strength than the storage portion 40. A torn groove 45 is formed in the front portion of the cover plate 44 along the entire length in the up and down direction. The airbag cushion 41 inflates due to the action of the jet gas of the inflator 42 when the vehicle 100 collides, and breaks the torn groove 45 and deploys toward the side. The torn groove 45 illustrated in FIG. 3 is formed on the outer surface of the cover plate 44, but may be also formed on the inner surface of the cover plate 44.

FIG. 4 is a perspective view of an example of the airbag cushion 41. FIG. 4 illustrates the airbag cushion 41 when inflated. The direction illustrated in FIG. 4 indicates the direction of the vehicle 100. The airbag cushion 41 is a panel formed by joining two panels of convex shape in a plan view, via a gusset having a thickness in the vehicle width direction. Alternatively, the airbag cushion 41 may be a rectangular parallelepiped shape that fills both side portions of the convex portion. A housing portion 411 that stores the cylinder type (cylindrical) inflator 42 is provided inside the airbag cushion 41. The housing portion 411 has insertion holes 412, 413 through which the stud bolt 421 of the inflator 42 is inserted. The inflator 42 operates in the event of emergency such as collision of the vehicle 100, to jet gas into the airbag cushion 41. The airbag cushion 41 explosively inflates through the action of the jet gas of the inflator 42. The inflation pressure of the airbag cushion 41 acts on the cover plate 44, while being supported by the bottom plate of the storage portion 40. The airbag cushion 41 breaks the torn groove 45, and inflates and deploys outside of the storage portion 40. Note that, inflation and deployment will be hereinafter referred to as merely deployment.

In the following description, the airbag cushion 41 is conceptually comprised of three portions. A portion in front of the housing portion 411 is defined as a first portion 41a, a portion disposed behind the housing portion 411 is defined as a second portion 41b, and a portion disposed behind the second portion 41b is defined as a third portion 41c. The first portion 41a is a portion extending from one end of the airbag cushion 41 in the front and back direction (horizontal direction) to the vicinity of the housing portion 411. The second portion 41b is a portion extending opposite to the first portion 41a in the front and back direction by a predetermined length when viewed from the housing portion 411. The third portion 41c is a portion further extending from the second portion 41b disposed opposite to the first portion 41a with respect to the housing portion 411. The second portion is provided mainly at a position corresponding to a space between adjacent seats (driver seat, passenger seat). The first portion 41a, the second portion 41b, and the third portion 41c are conceptually divided. The boundary between the first portion 41a and the second portion 41b, and the boundary between the second portion 41b and the third portion 41c are not strict. The position of the housing portion 411 in FIG. 4 is the boundary between the first portion 41a and the second portion 41b, but the configuration is not limited thereto. The position of the housing portion 411 may be located in front of or behind the position illustrated in FIG. 4. In other words, irrespective of the position of the housing portion 411, when the boundary of the first portion 41a and the second portion 41b is fixed to the vicinity of the front end of the convex portion in the front and back direction as illustrated in FIG. 4, the housing portion 411 may be included in the first portion 41a or may be included in the second portion 41b.

FIGS. 5 and 6 are explanatory views illustrating a method of folding the airbag cushion. FIG. 5 illustrates the method of folding the airbag cushion 41 into a flat shape. As illustrated in FIG. 5, the convex portion is folded inside the airbag cushion 41. Alternatively, the convex portion may be folded in the front and back direction of the sheet. Similar to the convex portion, the bottom portion of the airbag cushion 41 is also folded inward or folded in the front and back direction of the sheet. The airbag cushion 41 is put into the state in FIG. 5B from the state in FIG. 5A.

FIG. 6 illustrates a method of folding the airbag cushion 41 for storing the airbag cushion in the storage portion 40. FIG. 6 shows plan views illustrating the vertically elected airbag cushion 41 folded in a flat shape when viewed from above. As illustrated in FIG. 6A, the inflator 42 is stored in the housing portion 411. As illustrated in FIG. 6B, the first portion 41a of the airbag cushion 41 is folded into a roll shape. In this case, it is folded clockwise when viewed from above. Such folding will be hereinafter referred to as "clockwise folding into a roll shape". As illustrated in FIG. 6C, the second portion 41b is folded back from the back to the front (side of the first portion 41a). The left side of the folded first portion 41a is covered with the second portion 41b. As illustrated in FIG. 6D, the third portion 41c is folded into a roll shape. In this case, it is folded counterclockwise when viewed from above. Such folding will be hereinafter referred to as "counterclockwise folding into a roll shape". As illustrated in FIG. 6D, in the folded airbag cushion 41, the first portion 41a is sandwiched between the third portion 41c and the housing portion 411. Also, the housing portion 411 is disposed behind the folded portion of the first portion 41a. As illustrated in FIG. 3, the folded airbag cushion 41 is stored in the storage portion 40 such that the third portion 41c is located in the front portion of the vehicle and the housing portion 411 is located in the rear portion of the vehicle. The air cushion is fixed to the storage portion 40 with the stud bolt 421 provided on the inflator 42. Furthermore, the airbag cushion 41 and the storage portion 40 are covered with the cover plate 44.

In light of the above, the manufacturing procedure of the side airbag device 4 is as follows. FIG. 7 is a flowchart illustrating an example of the manufacturing procedure of the side airbag device. First, the airbag cushion 41 is prepared (step S1). Other necessary components such as the inflator 42 are also provided. The inflator 42 is stored in the housing portion 411 of the airbag cushion 41 (step S2). The airbag cushion 41 is folded into a flat shape as illustrated in FIG. 5 (step S3). The first portion 41a of the airbag cushion 41 is folded (step S4). The second portion 41b is folded back (step S5). The third portion 41c is folded (step S6). The airbag cushion 41 is fixed (step S7). The airbag cushion 41 is fixed to, for example, the side portion of the driver seat 3 on the side of the driver seat 2. Then, the airbag cushion 41 and the storage portion 40 are covered with the cover plate 44.

FIG. 8 are explanatory views illustrating a deployment process of the airbag cushion. FIG. 8 are views illustrating the vehicle cabin 1 when viewed from above. FIG. 8A illustrates the state before deployment. FIG. 8B illustrates the state after the start of deployment. After the start of deployment, the first portion 41a is folded clockwise into a roll shape when viewed from above the vehicle cabin 1 and thus, attempts to push the third portion 41c to the front left while deploying. The force applied by the first portion 41a acts to direct the third portion 41c toward the passenger seat 3. The third portion 41c is folded counterclockwise into a roll shape when viewed from above the vehicle cabin 1 and thus, deploys while inclining toward the passenger seat 3 due to the force generated by deployment from the folded state, in addition to the force applied by the first portion 41a. The second portion 41b deploys while inclining toward the passenger seat 3, that is, to the left, due to the force of deployment activated by gas from the inflator 42. The first portion 41a is folded clockwise into a roll shape and thus, deploys while inclining to the right in the vehicle cabin 1 due to the force generated by deployment from the folded state. As a result, as illustrated in FIG. 8B, the state of the airbag cushion 41 is V-shaped in a plan view.

FIG. 8C illustrates the airbag cushion when deployed. FIG. 9 is a front view illustrating the airbag cushion when deployed. FIG. 9 is a view illustrating the vehicle cabin 1 when viewed from the front. As illustrated in FIGS. 8C and 9, in the deployed airbag cushion 41, the third portion 41c rides up on the passenger seat 3. As a result, the occupant seated in the driver seat 2 can be suppressed from moving toward the passenger seat 3. In addition, the restraint position of the airbag cushion 41 is fixed, and a reaction force from the passenger seat 3 is also used to mitigate an impact force of the collision experienced by the occupant.

In the first embodiment, the first portion 41a is folded clockwise into a roll shape, while the third portion 41c is folded counterclockwise into a roll shape. Three cases of varying the combination of roll folding will be described below. Similar to the side airbag device according to the first embodiment, the side airbag device 4 according to the following embodiments includes the storage portion 40, the airbag cushion 41, and the inflator 42.

Second Embodiment

FIG. 10 is an explanatory view illustrating a method of folding the airbag cushion according to a second embodiment. In the present embodiment, the first portion 41a and the third portion 41c are folded clockwise into a roll shape when viewed from above the vehicle cabin 1. In the airbag cushion 41 in the present embodiment, the first portion 41a is folded clockwise into a roll shape and thus, immediately after the start of deployment, applies a force moving in the front-left direction of the vehicle 100 to the second portion 41b and the third portion 41c. In addition, the third portion 41c is folded clockwise into a roll shape and thus, deploys while inclining in the right direction (the direction opposite to the passenger seat 3) due to the force of deployment activated by gas from the inflator 42.

The side airbag device 4 in the present embodiment can suppress the occupant seated in the driver seat 2 from moving toward the passenger seat 3 in the same manner as in the first embodiment, and achieves following effects. Since the third portion 41c is intended to move away from the passenger seat 3, the third portion 41c will be deployed to some degree and then, progress to the passenger seat 3. When an occupant seated in the passenger seat 3 is present, the airbag cushion 41 during deployment can be suppressed from making contact with the occupant to apply a strong impact to the occupant.

Third Embodiment

FIG. 11 is an exploded view illustrating a method of folding the airbag cushion according to a third embodiment. In the present embodiment, the first portion 41a and the third portion 41c are folded counterclockwise into a roll shape when viewed from above the vehicle cabin 1. In the airbag cushion 41 in the present embodiment, the first portion 41a is folded clockwise into a roll shape and thus, immediately after the start of deployment, applies a force moving toward the passenger seat 3 to the second portion 41b and the third portion 41c. The third portion 41c is folded counterclockwise into a roll shape and thus, deploys while inclining toward the passenger seat 3 due to the force of deployment activated by gas from the inflator 42.

The side airbag device 4 in the present embodiment can suppress the occupant seated in the driver seat 2 from moving toward the passenger seat 3 in the same manner as in the first embodiment, and achieves following effects. Since the entire airbag cushion 41 is intended to move toward the passenger seat 3 immediately after the start of deployment, time required for the airbag cushion 41 to reach the passenger seat 3 can be decreased.

Fourth Embodiment

FIG. 12 is an exploded view illustrating a method of folding the airbag cushion according to a fourth embodiment. In the present embodiment, the first portion 41a is folded counterclockwise into a roll shape when viewed from above the vehicle cabin 1, while the third portion 41c is folded clockwise into a roll shape when viewed from above the vehicle cabin 1. In the airbag cushion 41 in the present embodiment, the first portion 41a is folded counterclockwise into a roll shape and thus, immediately after the start of deployment, applies a force moving in the front direction of the vehicle 100 to the third portion 41c. The third portion 41c is folded clockwise into a roll shape and thus, deploys while inclining away from the passenger seat 3 due to the force of deployment activated by gas from the inflator 42.

The side airbag device 4 in the present embodiment can suppress the occupant seated in the driver seat 2 from moving toward the passenger seat 3 in the same manner as in the first embodiment, and achieves following effects. The third portion 41c deploys to a predetermined degree and then, progresses toward the passenger seat 3. Accordingly, even when the driver seat 2 is further from the passenger seat 3 in the width direction, the airbag cushion 41 can be deployed such that the third portion 41c makes contact with the front of the passenger seat 3.

In the first to fourth embodiments, the first portion 41a and the third portion 41c of the airbag cushion 41 are folded into a roll shape. No such limitation is intended, and one or both of the first portion 41a and the third portion 41c may be folded into a bellows shape, that is, may be subjected to so-called accordion fold.

Selection of the folding method of the airbag cushion 41 from any one of the first to fourth embodiments, lengths of the first portion 41a, the second portion 41b, and the third portion 41c of the airbag cushion 41 (lengths in the front and back direction illustrated in FIG. 4), and the ratio of the lengths are appropriately designed for each vehicle. Additionally, the height of side airbag device 4 from the floor surface 10 may be appropriately designed for each vehicle.

Although the side airbag device 4 is installed in the driver seat 2, the side airbag device may be provided in the passenger seat 3. In this case, the side airbag device 4 installed in the driver seat 2 and the side airbag device 4 installed in the passenger seat 3 are symmetrically structured as a mirror image.

The technical features (constituent elements) described in the embodiments may be combined with each other to form new technical features.

It is to be presumed that while the embodiments disclosed herein are illustrative in all respects, they are not restrictive. It is intended that the scope of the present invention is not indicated by the abovementioned meaning, but by Scope of the Patent Claims, and includes all changes in the meaning and scope equivalent to the Scope of the Patent Claims. Note that the reference signs appended to the claims are assigned in order to facilitate understanding of the claims.

REFERENCE NUMERALS

100: Vehicle
1: Vehicle cabin
10: Floor surface
2: Driver seat
22: Backrest
3: Passenger seat
4: Side airbag device
40: Storage portion
41: Airbag cushion
41a: First portion
41b: Second portion
41c: Third portion
411: Housing portion
42: Inflator

The invention claimed is:

1. An airbag cushion in combination with an airbag device having a housing portion for storing an inflator, the airbag comprising;
a first portion folded in a roll or bellows shape from one horizontal end of the airbag cushion to a vicinity of the housing portion;
a second portion that horizontally extends opposite to the first portion, the second portion being folded back toward the folded first portion and covering a lateral side of the first portion; and
a third portion that further extends from the second portion disposed opposite to the housing portion with respect to the first portion, the third portion being folded in a roll or bellows shape, at least a portion of the third portion adapted to made contact with a front of an opposite seat to the seat upon inflation and deployment of the airbag cushion,
wherein the folded third portion is disposed in front of the first portion, and
wherein the housing portion is disposed behind the folded portion of the first portion.

2. The airbag cushion of an airbag device according to claim 1, wherein the housing portion is included in the second portion.

3. The airbag cushion of an airbag device according to claim 1, wherein the housing portion is included in the first portion.

4. The airbag cushion of an airbag device according to claim 1, wherein the housing portion is provided in a boundary portion between the first portion and the second portion.

5. The airbag cushion of an airbag device according to claim 1, wherein
the first portion is folded clockwise into a roll shape when viewed from above the vehicle cabin, and
the third portion is folded counterclockwise into a roll shape when viewed from above the vehicle cabin.

6. The airbag cushion of an airbag device according to claim 1, wherein
the first portion is folded clockwise into a roll shape when viewed from above the vehicle cabin, and
the third portion is folded clockwise into a roll shape when viewed from above the vehicle cabin.

7. The airbag cushion of an airbag device according to claim 1, wherein
the first portion is folded counterclockwise into a roll shape when viewed from above the vehicle cabin, and
the third portion is folded counterclockwise into a roll shape when viewed from above the vehicle cabin.

8. The airbag cushion of an airbag device according to claim 1, wherein
the first portion is folded counterclockwise into a roll shape when viewed from above the vehicle cabin, and
the third portion is folded clockwise into a roll shape when viewed from above the vehicle cabin.

9. A method for manufacturing an airbag device with an airbag cushion, the method comprising:
preparing the airbag cushion having a housing portion that stores an inflator for inflation and deployment of the airbag cushion;
folding a first portion extending from the housing portion into a roll or bellows shape from one horizontal end of the airbag cushion to a vicinity of the housing portion;
folding back a second portion horizontally extending opposite to the first portion when viewed from the housing portion toward the folded first portion; and
folding a third portion further extending from the second portion disposed opposite to the housing portion with respect to the first portion into a roll or bellows shape, and disposing the third portion opposite to the housing portion with respect to the first portion such that the folded third portion is disposed in front of the first portion, and the housing portion is disposed behind the folded portion of the first portion,
wherein the second portion covers a lateral side of the first portion, and
wherein at least a portion of the third portion is adapted makes contact with a front of an opposite seat to the seat upon inflation and deployment of the airbag cushion.

10. A method of deploying an airbag device that inflates and deploys in a vehicle cabin of a vehicle to laterally restrain an occupant seated in a seat, an airbag cushion of the airbag device comprising:
a housing portion that stores an inflator for inflation and deployment of the airbag cushion;
a first portion that extends from the housing portion to a front of the vehicle, the first portion being folded in a roll or bellows shape from the front to a vicinity of the housing portion;
a second portion that horizontally extends opposite to the first portion when viewed from the housing portion, the second portion being folded back from a back to the front of the vehicle; and a third portion that further extends from the second portion to the front, the third portion being folded from the front in a roll or bellows shape and disposed in the front of the first portion, at least a portion of the third portion deploys to make contact with the front of an opposite seat to the seat.

11. An airbag device in combination with a seating arrangement of a vehicle having a first seat laterally disposed relative to a second seat, the airbag device comprising;

a housing portion for storing an inflator; and an airbag cushion for deployment from an inner lateral side of the a seatback of the first seat, the airbag cushion including:

a first portion folded from one horizontal end of the airbag cushion to a vicinity of the housing portion, the first portion for deployment in front of the seatback of the first seat;

a second portion that horizontally extends opposite to the first portion, the second portion being folded back toward the folded first portion, the second portion for deployment laterally between the first and second seats; and a third portion that further extends from the second portion disposed opposite to the housing portion with respect to the first portion, the third portion being folded, the folded third portion disposed in front of the first portion, and the third portion for deployment in front of a portion of a second seatback of the second seat.

* * * * *